United States Patent [19]

Williams

[11] 4,309,128
[45] Jan. 5, 1982

[54] METHOD AND APPARATUS FOR REMOVING DEFLECTION FROM PLASTIC PIPES

[76] Inventor: Richard L. Williams, 9180 Parker Rd., Harrod, Ohio 45850

[21] Appl. No.: 206,821

[22] Filed: Nov. 13, 1980

Related U.S. Application Data

[63] Continuation-in-part of Ser. No. 97,395, Nov. 26, 1979, which is a continuation-in-part of Ser. No. 72,073, Sep. 4, 1979, abandoned.

[51] Int. Cl.³ .............................................. F16L 1/00
[52] U.S. Cl. ..................................... 405/154; 138/97; 405/156
[58] Field of Search ............... 405/154, 155, 156, 157, 405/173; 166/207, 277; 72/370, DIG. 29; 175/55; 138/97; 29/234

[56] References Cited

U.S. PATENT DOCUMENTS

| Re. 23,381 | 6/1951 | Bodine | 166/249 |
|---|---|---|---|
| 2,184,809 | 12/1939 | Brammer | 166/249 |
| 2,229,912 | 1/1941 | Baily | 175/55 X |
| 2,522,171 | 9/1950 | Forman et al. | 138/97 X |
| 2,601,248 | 6/1952 | Brenholdt | 138/97 X |
| 3,113,621 | 12/1963 | Krueger et al. | 166/249 |
| 3,123,101 | 3/1964 | Blount et al. | 138/97 |
| 3,294,121 | 12/1966 | Powell et al. | 138/97 |
| 3,543,377 | 12/1970 | Bremmer | 29/234 |
| 3,602,263 | 8/1971 | Bremmer | 138/97 |

FOREIGN PATENT DOCUMENTS

| 334295 | 1/1977 | Austria . |
| 1171830 | 1/1965 | Fed. Rep. of Germany . |
| 1434096 | 4/1976 | United Kingdom . |

*Primary Examiner*—Dennis L. Taylor
*Attorney, Agent, or Firm*—Albert L. Jeffers

[57] ABSTRACT

Method and apparatus for substantially reconstituting the internal diameter of sewer, water or drain line plastic pipes after being located in situ comprising a movable housing, sized preferably to at least 95 percent of the inside diameter of the pipe, and housing carried vibration means for causing such reconstitution of said pipe diameter substantially by virtue of vibration induced reallocation of the pipe encompassing earth or filler bed material.

16 Claims, 9 Drawing Figures

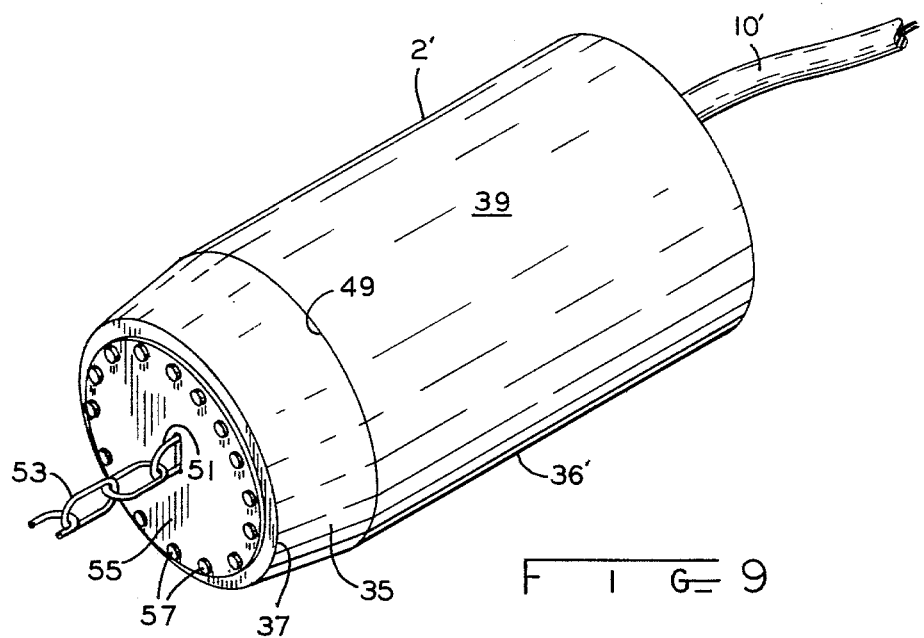

METHOD AND APPARATUS FOR REMOVING DEFLECTION FROM PLASTIC PIPES

RELATED APPLICATIONS

This application is a continuation-in-part of my application Ser. No. 97,395, filed Nov. 26, 1979, which was a continuation-in-part of my application Ser. No. 72,073, filed on Sept. 4, 1979, now abandoned.

BACKGROUND OF THE INVENTION

This invention relates to new and improved methods and apparatus for reconstituting the internal diameters of plastic sewer, water or drain pipes after the pipe is placed in and permanently located in situ in an earth bed or other underground earth base or covered location by vibration compacting or relocation of the bedding materials; and which, in addition, enhances the prevention of subsequent normally caused deformations in the diameter of such plastic pipes.

Heretofore, difficulties have been encountered in the use of plastic pipes subject to such diameter deflection or deformation in sewer, water and drain lines primarily because, when the earth covering backfill is applied to such pipes, the weight of the earth causes a deformation in the internal diameter of the plastic pipes, i.e., from circular to an ellipse or egg-shaped. Such egg-shaped deformations, of course, tended to result in leakage between the connected ends of the plastic pipe sections at the juncture of the connected ends of the plastic pipe sections at the juncture of the connections therebetween resulting in water waste, sewage leakage contamination and similar ecological problems.

Aside from the leakage of the sewage contamination of the soil when a high water table is encountered, we have a problem of infiltration or of ground water leaking into the pipe. In practically all sewage systems because of the grade required to flow raw sewage, it becomes necessary to install lift stations or lift pumps which are operated with electricity. When the infiltration occurs, this overloads the sewer and many times causes flooding of basements, etc. Also, with the excessive flow, the cost of electricity is increased. For these reasons, it is important to have a leak proof seal as now required by the Environmental Protection Agency.

The amount of flexible pipe deflection is very dependent on the type of soil, the density of the soil, the placement of the pipe and soil, and the moisture content of the soil. The plastic pipe will receive a certain amount of pressure from the backfill water, active and passive pressure superimposed loads and live loads.

As a consequence, government regulations have been promulgated which, not only define the earth covering requirements for such pipes in ditches, trenches, excavations and the like, but also, in the maximum allowable deformation of the internal diameter of the plastic pipes. At present, such government regulations permit such diameter deformation only to less than 5 percent of the internal diameter of the plastic pipe prior to its being buried in the earth and/or other bed materials.

To assure that this diameter deformation limitation is met by contractors installing such plastic pipes, these government regulations also set forth certain testing techniques, one of which is the commonly known ball technique. In this technique, a metal ball having a diameter which is comparable to 95 percent of the inside diameter of the plastic pipe is pulled through the pipe when in situ, generally from convenient locations, such as from manhole to adjacent manhole. In the event that the ball sticks in the pipe anywhere between the manhole inlet and the adjacent manhole outlet, the engineer requires the contractor to dig up the entire section of plastic pipe between the manholes and recompact the bedding material along the sides of pipe and under the haunches of the pipe and backfill the entire depth of the trench and allow the backfill to settle for at least 30 days and then retest that portion for deflection, resulting in a considerable unexpected financial and time loss to the contractor.

SUMMARY OF THE INVENTION

These and other problems, difficulties and disadvantages of the prior art, among others, are substantially overcome with the present invention by the provision of a vibrator-compactor device which can be moved through the plastic pipe after it is located in situ and which, because of the effects of the vibration caused thereby, tends to relocate and compact the bedding material, dirt or earth surrounding the pipe, while at the same time, permitting the stressed pipe to return substantially to its original diameter, i.e., the diameter existing prior to the pipe being buried in situ. Plastic pipe will return to the shape it originally formed because the plastic pipe has an inherent property known as elastic memory. The vibrator-compactor device of the present invention not only performs the testing function to comply basically with the government requirements, but also acts to reconstitute or reshape the plastic pipe while in situ. The vibrator-compactor device of the present invention is inexpensive to manufacture, and, indeed, can be manufactured to provide a variety of diameter sizes geared to fit the inside diameter of most normally employed sewer, water and drain line plastic pipes.

It is, therefore, an object of the present invention to provide new and improved methods and apparatus for rerounding or reconstituting plastic pipe deformed diameters to substantially their original diameter dimension.

Another object of the present invention is to provide such methods and apparatus for rerounding or reconstituting a plastic pipe deformed diameter while the pipe is already in an earth covered trench, ditch or other excavation.

Still another object of the present invention is to provide such methods and apparatus for reconstituting the diameter of plastic pipes, while in situ, without requiring removal of the covering of earth or other fill from the pipe.

A further object of the present invention is to provide such methods and apparatus for reconstituting deformed plastic pipe diameters to within at least 95 percent of the original diameter of the pipe existing before laying and covering of the pipe in the trench, ditch or excavation.

A still further object of the present invention is to provide such methods and apparatus to reconstitute the deformed diameters of plastic pipes by vibrations generated from within the pipe.

Another object of the present invention is to provide means for correcting excessive deflection of plastic pipes while in situ by vibrations sufficient to compact and/or densify the bed filler material below and adjacent the pipe while the pipe is in situ.

Still another object of the present invention is to provide new and improved methods and apparatus for reconstituting plastic pipe diameters while in situ by vibrations generated from within the pipe which also compact and densify the bed filler materials below and adjacent the pipe.

A further object of the present invention is to provide methods and apparatus for generating vibrations from within the pipe by passing a vibrator device through the pipe.

DESCRIPTION OF THE DRAWING

These and other objects, features and advantages of the present invention, among others, will become readily apparent to one skilled in the art from a careful consideration of the following detailed description, when considered in conjunction with the accompanying drawing, wherein like reference numerals refer to like and corresponding parts throughout the several views, and wherein:

FIG. 9 is a perspective view of a modification of the cylindrical housing.

BRIEF DESCRIPTION OF A PREFERRED EMBODIMENT

Figure 1:
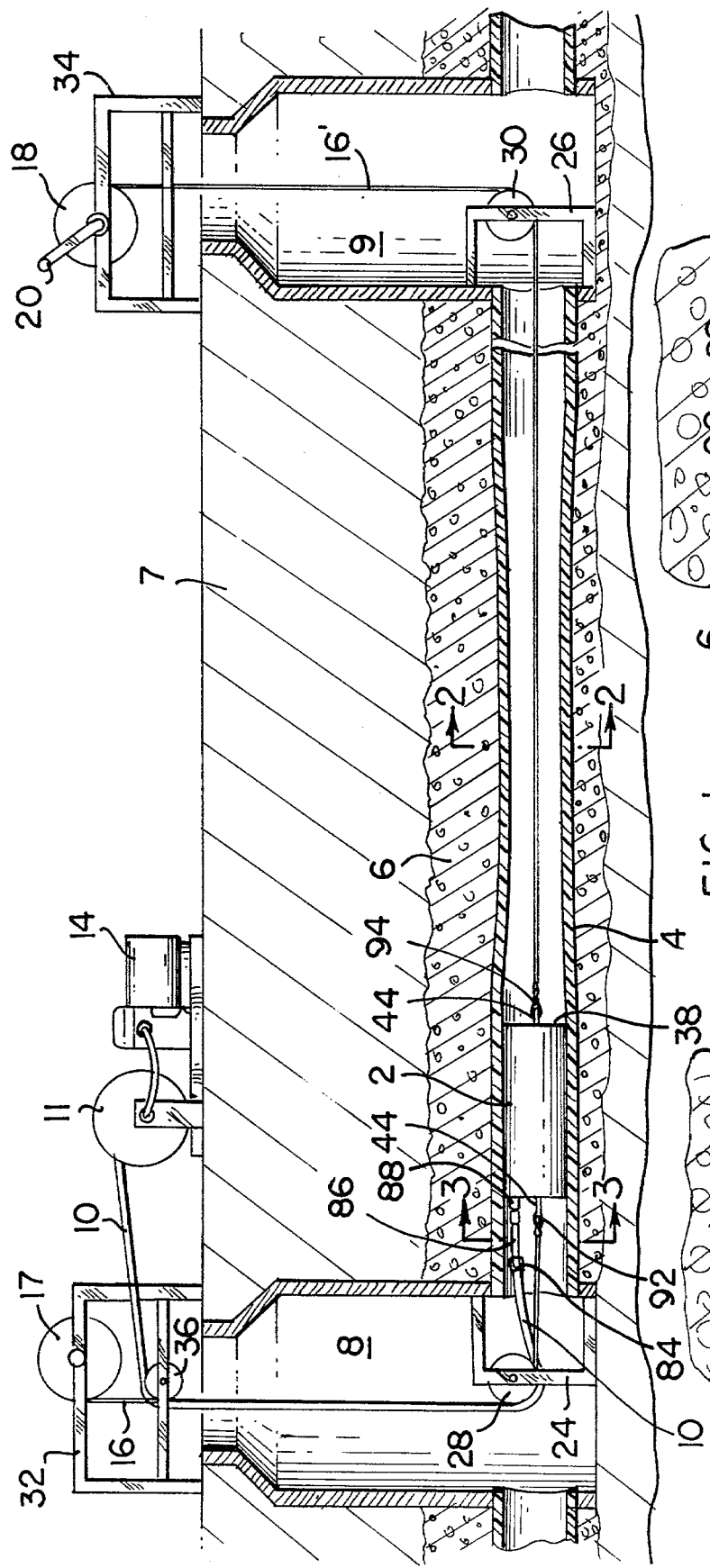
FIG. 1 illustrates schematically a system employing the methods and apparatus of the present invention to reconstitute the diameter of plastic pipes while in situ.

Referring to FIG. 1, there is disclosed a pneumatically actuable vibrator-compactor device 2 constructed in accordance with the present invention shown operationally disposed in a conventional sewer plastic pipe 4 which is located in a bed of pea gravel material 6 having a backfill 7 of earth or dirt thereupon.

Access to the pipe 7 is provided by a pair of spaced manholes 8 and 10.

In order to provide a source of pneumatic pressure to operate the vibrator-compactor device 2, a compressor 14 is located on the surface of the backfill and supplies pressurized air to a movable hose 10 which is fed off of a reel 11. The hose 10 is connected to the device 2 in a manner hereinafter described.

In accordance with the present invention, the vibrator-compactor device 2 is pulled through the pipe 4 by means of a cable system which includes a cable 16 carried by a take-off reel 17 located above the ground level. Cable 16 is connected to the device 2 at one end thereof. Cable 16 acts in unison with a second cable 16' connected to the device 2 and to a take-up reel 18 mounted on stanchion 34 and actuatable by a hand crank 20 or by other means to move the device 2 and cable 16' in the direction toward manhole 9. The manholes 8 and 10 are each provided with a removable reel spacer 24 and 26, respectively, to space the spacer reels 28 and 30 from the pipe 4 and adjacent dirt to prevent breakage of the cables 16 and 16', as well as the hose 10. Similarly, removable stanchions or spacers 32 and 34 are provided for supporting the cable reels 17 and 18. It is noted that a guide spacer reel 36 is also provided on stanchion 32 for the pneumatic hose 10 for spacing of the hose 10 with respect to the reel 28. Reel 28 spaces not only the cable 16 unit, but also the hose 10.

Figure 2:
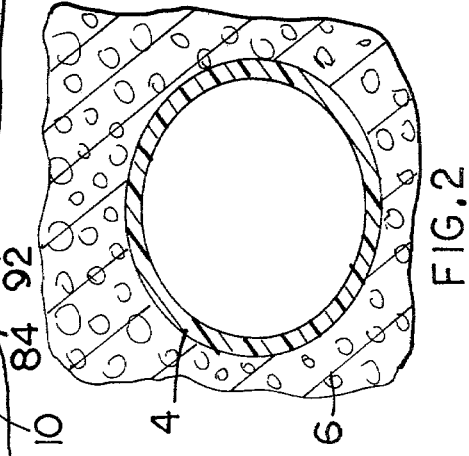
FIG. 2 is an enlarged fragmentary view taken along line 2—2 of FIG. 1.

As appears in FIG. 2, the plastic pipe 4 has a diameter deflection resembling an ellipse or an egg shape as a result of the weight on top thereof caused by weight of the earth or dirt and bed filler material 6.

Figure 3:
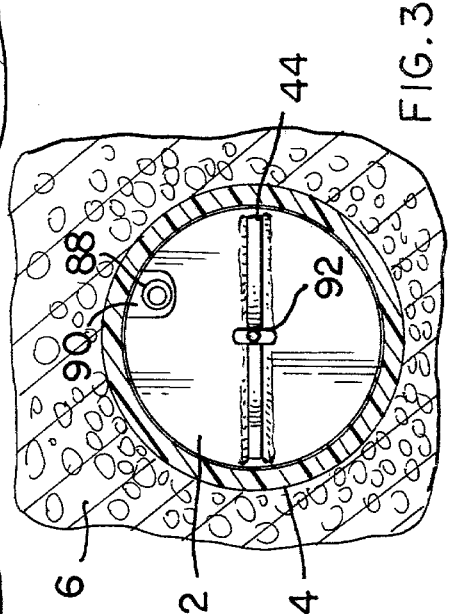
FIG. 3 is also an enlarged fragmentary view taken along line 3—3 of FIG. 1.

In FIG. 3 there is shown a comparison with FIG. 2 of the effects of the use of the vibrator-compactor device 2 of the present invention on the distorted or deflected diameter of the pipe 4 as well as the compacting effect of use of the present invention on the bed filler material 6 adjacent the horizontal center line of the pipe and as well as under the pipe.

The vibrations generated by the device 2, as it moves through the pipe 4, also tend to compact the surrounding filler material, thus permitting return of the pipe diameter dimension to substantially that diameter which existed before the pipe was placed in the ditch, trench or excavation and covered with the filler bed material and the backfill, such as earth. It has also been observed in actual tests performed that the device 2 transmits vibrations ahead of itself (upstream of the device) and thus initiates compacting of the filler bed material before the device reaches the location of such forwardly transmitted vibrations. In using the device 2 it has been found that backfill of less expensive material such as sand and gravel can be used in lieu of crushed limestone.

Figure 4:
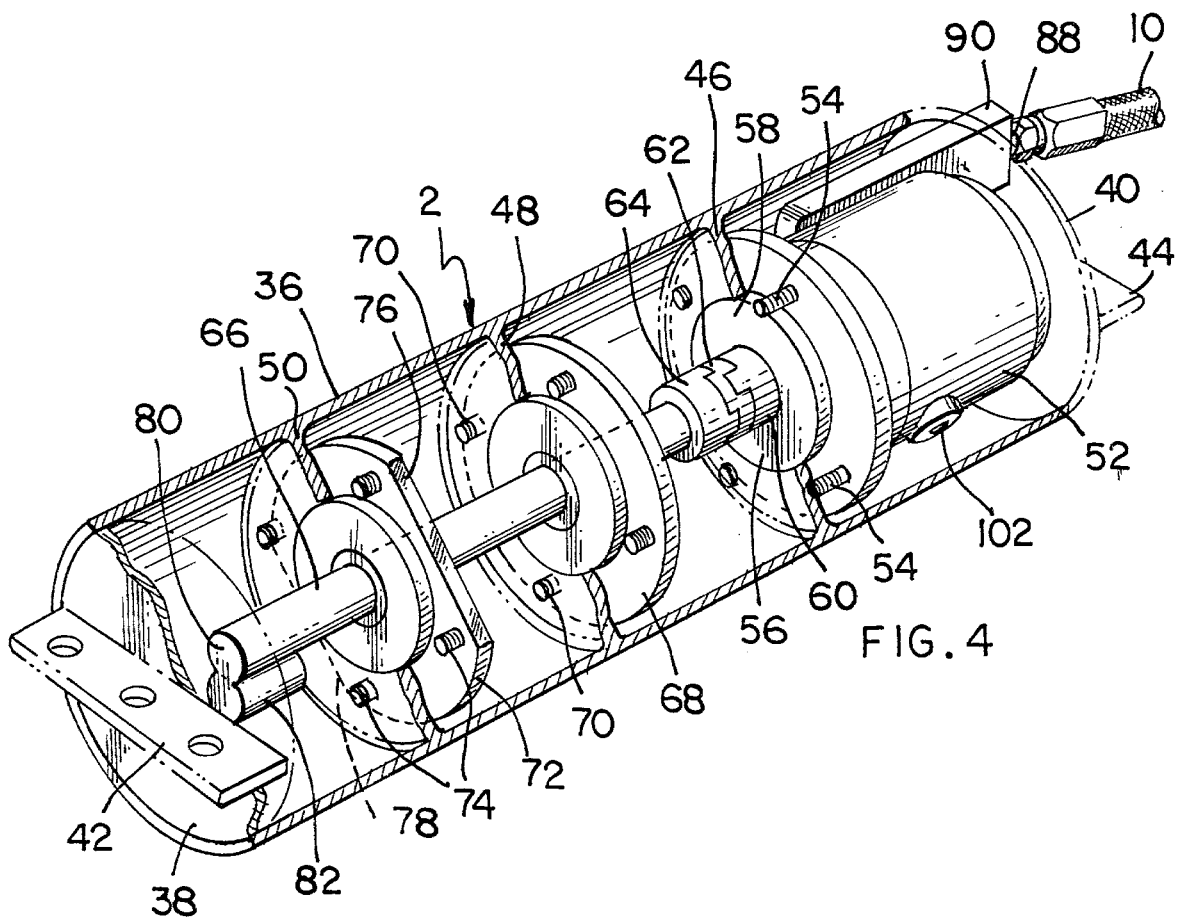
FIG. 4 is a perspective view in partial section illustrating a vibrator-compactor device constructed in accordance with the present invention.
Figure 5:
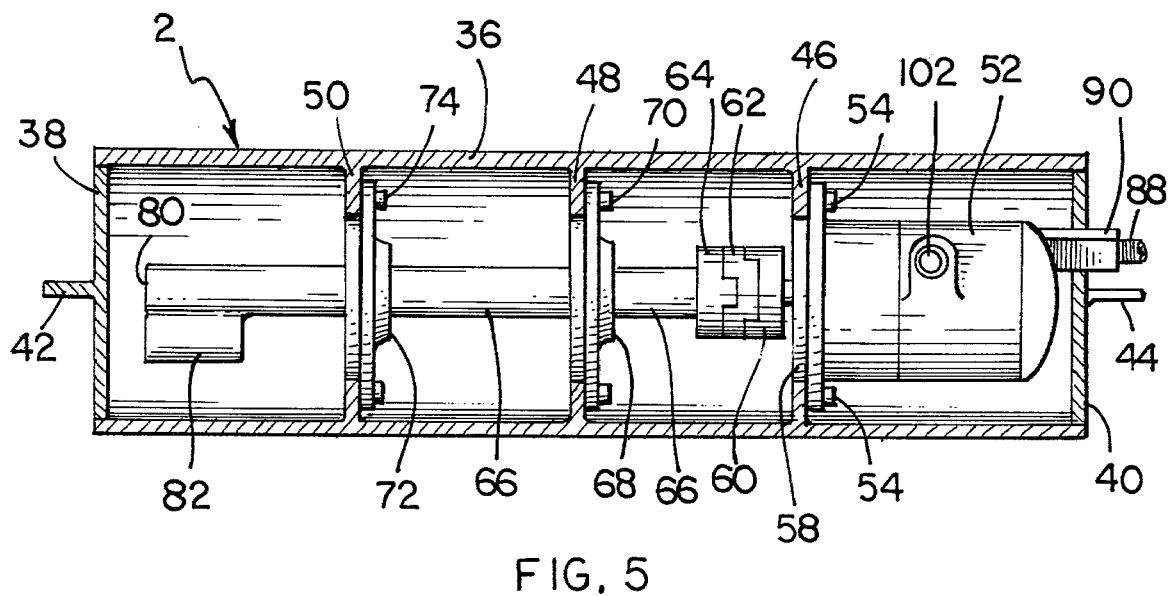
FIG. 5 is a side view in partial section of the device of FIG. 4.

As shown in FIGS. 4 and 5, the device 2 includes a cylindrical housing 36 having opposite end walls 38 and 40. The end walls 38 and 40 carry mounting flanges 42 and 44 which are connectable by the cables 16' and 16, respectively.

The cylindrical 36 is hollow and has three internal spaced partition walls. Partition wall 46 is provided to fixedly carry the pneumatically operated motor 52, as by four bolts 54. The wall 46 is apertured as at 56 to permit reception of a support 58 for the motor shaft 60. The motor shaft 60 has a drive coupler 62 which is connected to a corresponding coupler 64 carried by the vibrator drive shaft 66.

In accordance with the present invention, the drive shaft 66 is carried in bearing means which, as shown in FIG. 4, comprises a first bearing means 68 fixedly carried by the partition wall 48 which is adjacent the partition wall 46. Means such as bolts 70 may be employed to removably mount the bearing means 68 in press fitting engagement with the partition wall 48.

The bearing means for the shaft 66 also include a second bearing means 72 carried by the partition wall 50 to which it is secured in press fitting engagement as by bolts 74.

In order to permit removal and insertion of the bearing means 72 in the housing 36, two opposite sides 76 and 78 of the bearing 72 are sectioned, as shown in FIG. 4, to provide flat surfaces on opposite sides of the bearing 72.

It will be observed that the shaft 66 passes through both bearings 68 and 72 and at its end 80, as viewed in FIG. 4, the shaft 66 carries an offset mass or weight 82 which is provided to induce or generate the vibrations of the device 2.

Fluid-tight seal means (not shown) are provided for the opposite end walls 38 and 40 in order to contain a supply of lubricating motor oil. The volume of the cylinder 36 between the end wall 38 and partition wall 46 is filled by means not shown to approximately one-third by volume with the oil for such lubricating purposes. It has been observed that such lubricating oil enhances the torque characteristics of the vibrating shaft and associated offset mass or weight 82.

The weight of the mass 82 required is readily determinable in terms of the amplitude of the vibrations desired for any particular size device 2 or diameter of the housing 36.

The motor 52 may be that known as the "MR 10 Series Rotary Vane Air Motor" sold under that name by the Pneutronics Division of Gardner-Denver Company of Grand Haven, Mich. Preferably, the motor is that designated by the aforementioned company as the 74098 AA 3 Model. The bearings 68 and 72 may be the type of bearings sold under the "FC 900 Flange Cartridge" designation by the Browning Mfg. Division of Emerson Electric Company of Maysville, Ky.

Figure 6:
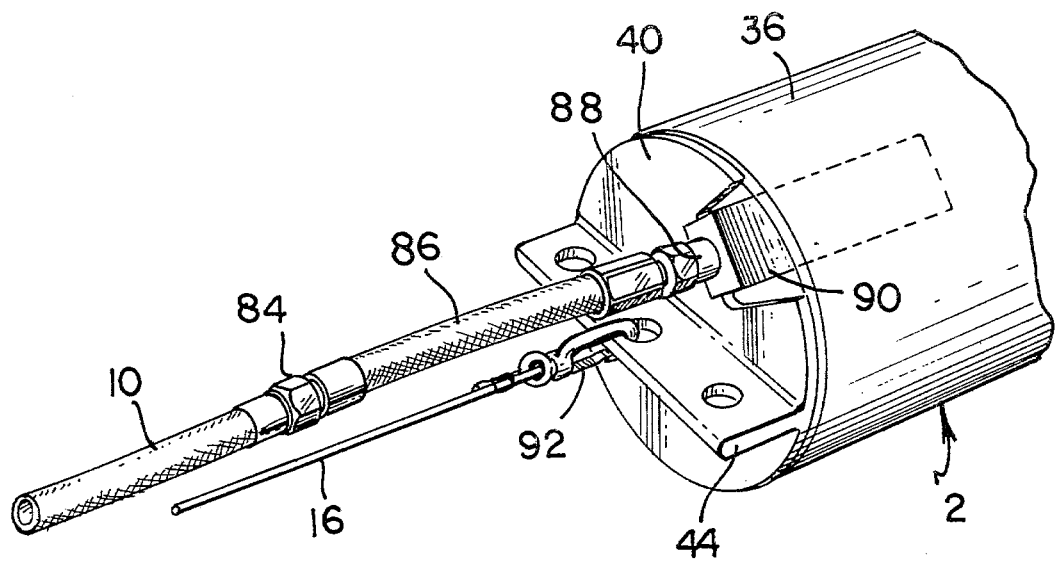
FIG. 6 is a fragmentary view in perspective illustrating the new and improved swivel means of the present invention for pneumatically actuating the motor of the device of FIGS. 4 and 5.

Referring now to FIG. 6, it will be observed that the pneumatic hose 10 includes a swivel joint connector 84 connecting to a short hose length 86 through a nipple 88 to a hose adaptor means 90 carried by the housing 36. In addition, the cable 16 carries a swivel snap hook or ring 92 for mounting of the cable 16 to the flange 44. Similarly, cable 16' is connected by a swivel snap hook 94 to the end wall 38 of the housing 36.

Figure 7:
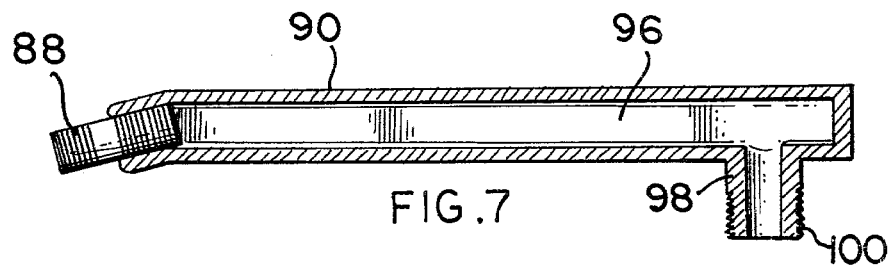
FIG. 7 is a side view in section of a pneumatic adaptor constructed in accordance with the present invention.
Figure 8:
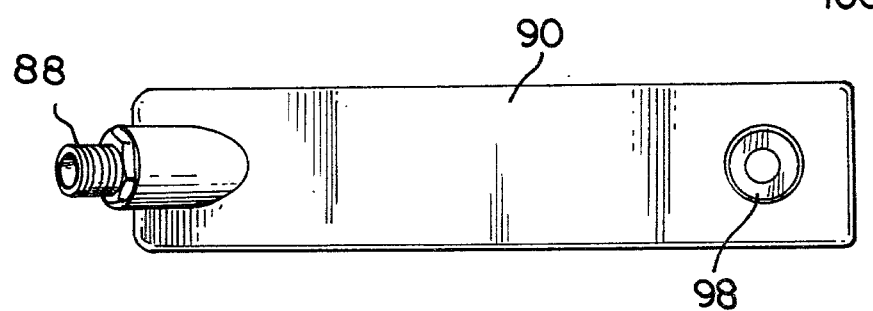
FIG. 8 is a bottom view in elevation of the adaptor of FIG. 7.

In FIGS. 7 and 8 are shown the details of the adaptor means 90. Adaptor means 90 includes an axial fluid flow passageway 96 which communicates with the nipple 88 to permit flow of air therethrough in the direction from the nipple 88 to the passageway 96. The adaptor 90 has an outlet flow nipple 98 threaded as at 100 for connection with the air inlet (not shown) of the motor 52.

The motor 52 also has an air outlet 102 (FIGS. 4 and 5) for discharge of air from the motor through apertures (not shown) in the housing 36. The air discharged from the outlet 102 passes to the rear of the device 2 and, it has been found, provides a propelling and rotating effect to the device 2 which tends to move the device 2 forwardly through the pipe 4. Because of this rotational effect, the swivel joint 84 and swivel snap hooks 92 and 94 have been provided.

In FIG. 9 a modification to the cylindrical housing 36' is illustrated. The front portion of the housing is provided with a 10 to 15 degree taper at 35 so that the front portion 37 is approximately 15 percent smaller than the inside diameter of the plastic carrier pipe 4. The main portion 39 of the housing is approximately 5 percent less that the inside diameter of the plastic pipe. It has been found that by tapering the front portion of the housing that the compactor or rounder 2 will operate on excessive deflected plastic pipe such as 15 percent deflection and return the pipe to less than 5 percent deflection from its normal diameter thus complying with the present government regulations. The portion 35 is approximately 4 to 6 inches in axial length and is welded to the main housing 39 at 49. A loop 51 is connected to the end plate 55 which is secured to the housing by bolts 57. A chain 53 is used to pull the device 2' through the plastic pipe 4.

In operation, the device 2 is placed in the pipe 4 from one manhole 8, with the hose 10 connected thereto, as well as the cables 16 and 16'. The compressor 14 is actuated to cause operation of the motor 52 which, in turn, rotates the shaft 66 carrying the offset vibrator mass 82 to cause vibrations to be transmitted from the housing and through the bearings 68 and 74 to the filler bed material in which the pipe 4 reposes. Operation of the take-up reel causes movements of the device 2 through the pipe 4 in the direction of manhole 9 (FIG. 1) asserted by the effects of the air being discharged from the motor 52. The vibrations of the device 2 cause compacting of the filler material under and around the pipe 4 as the device 2 moves through the pipe. Movement of the device 2 through the plastic pipe section causes the deformed pipe to return to substantially its original diameter throughout its length, which existed before the pipe 4 was introduced into the trench and the fill and earth placed thereon.

It will be appreciated that, to conform to the government regulations, the diameter of the vibrator-compactor housing 36 need only be slightly less than that of the inside diameter of the pipe. It will be further appreciated that depending upon the size of the plastic pipe involved, the diameter of the housing 36 could be changed accordingly, as well as the weight, size and shape of the vibrator eccentric mass 82.

It will be expressly understood that the present invention relates to pipes made of plastic, PVC pipe, fiberglass reinforced plastic pipes or other flexible conduit materials having the tendency to deform or to deflect when subjected to the weight of the pipe encompassing earth or filler bed material. It will also be appreciated that the present invention provides stress relief not only to the pipe itself but also to the gaskets or other devices connecting pipe sections, one to the other.

While there have been disclosed particular embodiments of the present invention, other embodiments will become readily apparent to one skilled in the art and, accordingly, this invention should be considered to be limited in scope only by the accompanying claims.

I claim:

1. The method of restoring the diameter of a deflected flexible sewer or water pipe substantially to its original shape in an earth and bedding material encompassing situ comprising the steps of:
   (a) introducing into one end of the pipe a cylindrical vibrator-compactor device having an outside diameter slightly less than the inside diameter of the pipe,
   (b) initiating vibration of the device to transmit vibrations through the wall of the pipe to reform the bedding material to a higher density and stress relieve the pipe so as to restore the inside diameter of the pipe substantially to its original shape, and
   (c) propelling the device through the entire length of installed pipe completely backfilled substantially to the level of the original surface.

2. A device for substantially restoring the inside diameter of a deflected plastic sewer, water or drain pipe substantially to its original dimension when in an earth encompassing situ comprising a cylindrical housing having an outside diameter slightly less than the inside diameter of the pipe sufficient to move through the longitudinal, axial pathway defined by the inside diameter of the pipe, means connected to one end of the cylindrical housing for moving said housing through the pipe, and vibration means in said housing actuable to transmit vibrations through said housing and through the pipe, whereby transmitted vibrations act on the plastic pipe to reform the bedding material to a higher density and stress relieve the pipe so as to restore the inside diameter of the pipe substantially to its original shape.

3. The device of claim 2, wherein the flexible plastic pipe inside diameter is restored to approximately from about 95 percent to about 100 percent of the original inside diameter dimension of the pipe existing before the pipe is placed in situ.

4. The device of claim 2 including a motor in said housing for driving said vibration means.

5. The device of claim 4 wherein said motor is operated by pneumatic actuation means.

6. The device of claim 5 wherein said pneumatic actuation means includes movable hose means.

7. The device of claim 6 including swivel means connecting said hose means and said motor means to permit rotation of said housing about its longitudinal axis relative to said pipe.

8. The device of claim 7 wherein said motor means and said hose means are located adjacent one end of said housing.

9. The device of claim 2 including motor means mounted in said housing, bearing means in said housing for supporting a vibration means shaft when coupled to said drive motor means, a vibration means shaft coupled to said motor means and supported by said bearing means, and vibrator means carried by said shaft adjacent the end of the housing opposite the end of the housing in which the motor is located.

10. The device of claim 8 wherein said motor means is carried by a first partition wall in said housing.

11. The device of claim 10 wherein said bearing means comprises at least a pair of removable bearing assemblies carried in spaced relation by a pair of spaced partition walls located in said housing between said motor means and said vibrator means.

12. The device of claim 9 wherein said vibrator means is a mass of predetermined weight carried by said vibrator shaft.

13. The device of claim 12 wherein said mass is a cylinder carried in offset relation to said vibrator shaft adjacent the outer end of the vibrator shaft and in spaced relation to the adjacent end wall of the housing.

14. The device of claim 2, including detachable means to move the housing through the pipe, and means to detachably connect the detachable means to said housing.

15. The device of claim 2 wherein the cylindrical housing is provided with a tapered portion at one end to permit the housing to enter the deflected pipe.

16. The device of claim 15 wherein the tapered portion is in the range of 10 to 15 degrees.

* * * * *